Oct. 26, 1926.
T. C. REID
1,604,482
BRAKE FOR HAND TRUCKS
Filed Oct. 15, 1924
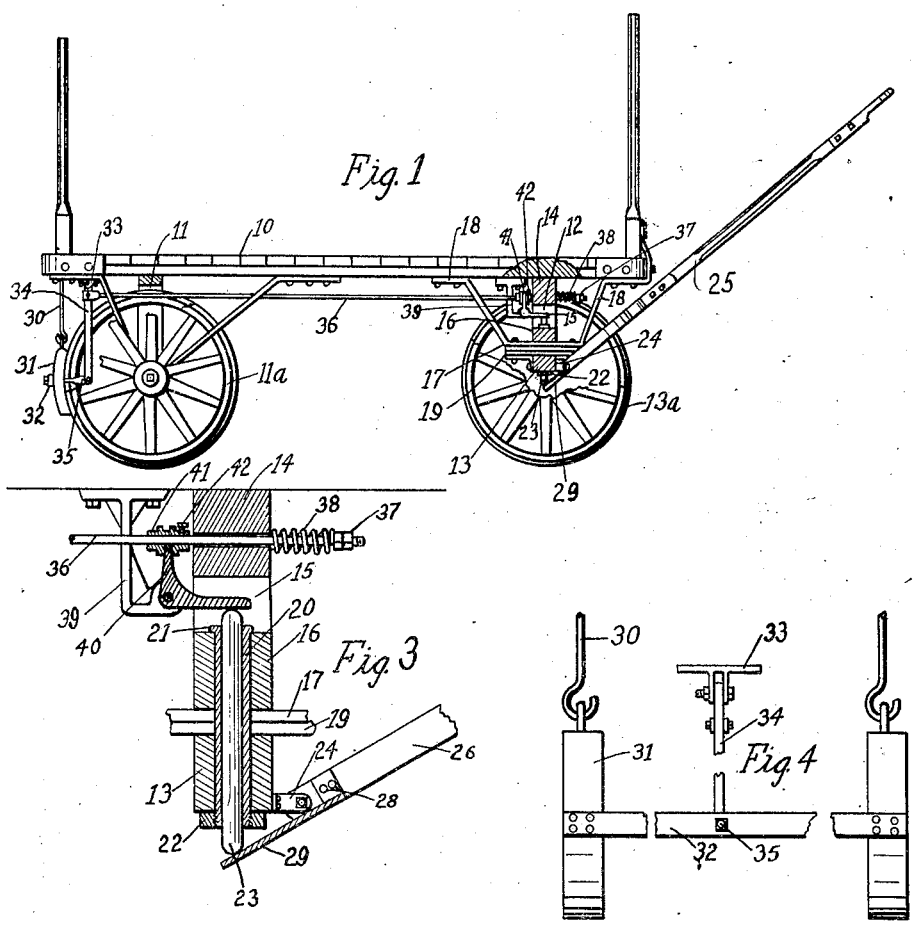
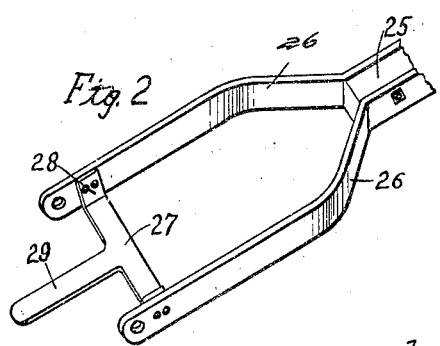
Inventor
Thomas C. Reid
by Owrg & Hague, Attys.

Patented Oct. 26, 1926.

1,604,482

UNITED STATES PATENT OFFICE.

THOMAS C. REID, OF CORNING, IOWA.

BRAKE FOR HAND TRUCKS.

Application filed October 15, 1924. Serial No. 743,819.

This invention relates to brake devices to be used in connection with hand trucks of that type having a pivoted front axle to which a pivoted tongue is secured.

The object of my invention is to provide a brake attachment for the truck, of simple, durable and inexpensive construction, so constructed and arranged that when the truck is not in use, the brake will be automatically set.

A further object is to provide in connection with the brake, means for yieldably retaining the brake in position and at the same time supporting the free end of the handle in an elevated position where it will be out of the way, the parts being so constructed and arranged that when the handle is moved to a lowered position for operating the truck, the brake will be automatically released.

A further object is to provide in connection with a brake attachment for hand trucks of the type above referred to, means for releasing the brake upon the lowering of the handle when the pivoted axle is in any of its various positions of movement.

My invention consists in the construction, arrangement and combination of the various parts of the device, whereby the objects contemplated are attained, as hereinafter more fully set forth, pointed out in my claims, and illustrated in the accompanying drawings, in which:—

Figure 1 is a side elevation of a hand truck, showing the manner in which my improved brake device is applied thereto, a portion of the wheels being broken away to show the brake mechanism.

Figure 2 is a detail perspective view of the pivoted end of the handle as constructed to incorporate my brake arrangement.

Figure 3 is a vertical, detail, sectional view showing the brake operating mechanism; and Figure 4 is a detail segmental view of the brake and a portion of the mechanism for operating the same.

The numeral 10 indicates the body portion of a hand truck which is provided with a rear axle 11 provided with wheels 11ª, and a support 12 for the front axle 13, the front axle 13 being provided with wheels 13ª.

The support 12 comprises a horizontally and transversely arranged beam 14, which is secured to the bottom of the body portion 10 and is provided with depending braces 15, the lower ends of said braces 15 being provided with a beam 16. The under surface of the beam 16 is provided with a circular plate 17, which forms a part of what is commonly known as the fifth wheel, the circular plate 17 being supported in position by means of brackets 18. A second circular plate 19 rests beneath the plate 17 and on top of the axle 13, the axle 13 being pivotally connected beneath the member 16 by means of a sleeve 20 which extends through the axle 13, the plates 19 and 17 and the member 16.

The sleeve 20 takes the place of what is commonly known as the "king bolt", having a head 21 at its upper end, and a nut 22 at its lower end.

The sleeve 20 is designed to slidingly receive a short shaft 23. The axle 13 has the forward edge of its forward face provided with a pair of brackets 24, which are spaced apart an equal distance on each side of the pin 23. A tongue or handle 25 has its lower end pivotally connected to said brackets, said tongue being provided with strap irons 26 which form a fork to provide means for pivotally connecting the tongue with the axle 13, as clearly shown in Figures 1 and 3.

The lower end of the members 26 is provided with a bar 27 which has upwardly extending portions 28, said portions 28 being riveted to the bar 26. The central portion of the member 27 is provided with a rearwardly and downwardly extending tongue 29, the lower end of which is designed to engage the lower end of the pin 23 in such a manner that as the free end of the tongue is elevated and lowered, the pin 23 will be elevated and lowered in the sleeve 20.

The rear end of the platform 10 is provided with a pair of downwardly extending links 30, each of which is provided with a brake shoe 31, the said brake shoes being connected by a brake beam 32, the brake shoes 31 being designed to engage the rear surface of the rear wheels, as clearly shown in Figure 1.

Mounted on the under surface of the platform 10, near the central portion of the rear end, is a bracket 33, to which a vertical lever 34 is pivotally mounted, the lower end of the lever 34 having a pivotally connected link 35 which extends rearwardly and is rigidly secured to the brake bar 32. A brake rod 36 is provided, which extends longitudinally beneath the platform 10 and has its rear end pivotally connected to the lever 34 near its upper end. The forward end of the rod 36 extends through the bottom member 14 and is screw-threaded and provided with lock nuts 37. An extensible spring 38 is mounted on the forward end of the rod, between the beam 14 and the lock nuts 37. The spring 38 provides means whereby the brake shoes 31 will be yieldably supported against the rear wheels 11ª with such tension that the truck will be locked against movement when not in use.

For releasing the brakes I have provided a bracket 39 which is mounted on the bottom of the body portion 10 and back of the member 14, said bracket being provided with a bell crank lever 40 having one arm extending horizontally between the members 14 and 16 to engage the upper end of the pin 23. The other arm extends upwardly, and is provided with a fork, between the ends of which is a sleeve 41, said sleeve being secured to the rod 36 by means of a set screw 42. The parts are so arranged that when the tongue 25 has its free end in an elevated position, the brake shoes will engage the wheels 11ª, the spring 38 being of such tension that the brake shoes will be secured in position and at the same time hold the tongue in the said elevated position.

When the operator wishes to move the truck from one point to another, he grasps the free end of the tongue and pulls it down to almost a horizontal position, which will cause the inner end of the member 29 to be elevated and in turn the pin 23, causing the bell crank 40 to be operated and the brake 36 to be moved rearwardly against the action of the spring 38, which in turn will cause the brake shoes 31 to be released from the wheels.

It will be seen that on account of the pin 23 being located centrally within the sleeve 20, the brake shoes 31 will be released when the front axle 13 is in any of its pivotal positions about the king bolt, and that the brakes will be automatically set at any time that the said tongue is released, regardless of the angular position of the front axle.

Thus it will be seen that I have provided a brake attachment for hand trucks of ordinary construction, which is simple and inexpensive, and which may be quickly and easily applied without materially altering the present truck construction, and which will automatically set the brakes any time that the tongue or handle is released, and at the same time elevate the tongue so that it will be out of the way.

I claim as my invention:

1. In combination, a truck provided with a rear axle having supporting wheels and transversely arranged beams at its forward end, a front axle for supporting said beams having supporting wheels, of a brake mechanism comprising a sleeve for pivotally connecting said front axle to one of said transversely arranged beams, one end of said sleeve being screw threaded, a nut for said screw threaded end, a rod slidably mounted in said sleeve, a brake mechanism for engaging said rear wheels, a rod extended longitudinally beneath the body of said truck for actuating said brake mechanism, the forward end of said rod extending through one of said transversely arranged beams, a spring for actuating said rod and for moving said brake mechanism to engagement with said wheels, a bell crank in engagement with the upper end of said slidable rod operatively connected with said brake rod, a tongue having forked members pivoted to said front axle, a cross bar between said forked members having a downwardly and rearwardly extending member designed to engage the lower end of said slidable rod.

2. In combination, a truck provided with a rear axle having supporting wheels and transversely arranged beams at its forward end, a front axle for supporting said beams having supporting wheels, of a brake mechanism comprising a sleeve for pivotally connecting said front axle to one of said transversely arranged beams, a rod slidably mounted in said sleeve, a brake mechanism for engaging said rear wheels, a rod extending longitudinally beneath the body of said truck for actuating said brake mechanism, the forward end of said rod extending through one of said transversely arranged beams, a spring for actuating said rod and for moving said brake mechanism to engagement with said wheels, a bell crank in engagement with the upper end of said slidable rod operatively connected with said brake rod, a tongue pivotally connected to said front axle, and means carried by said tongue for actuating said slidable rod as the outer end of said tongue is elevated and lowered for setting and releasing the brake mechanism.

Des Moines, Iowa, September 18, 1924.

THOMAS C. REID.